Figure 1:
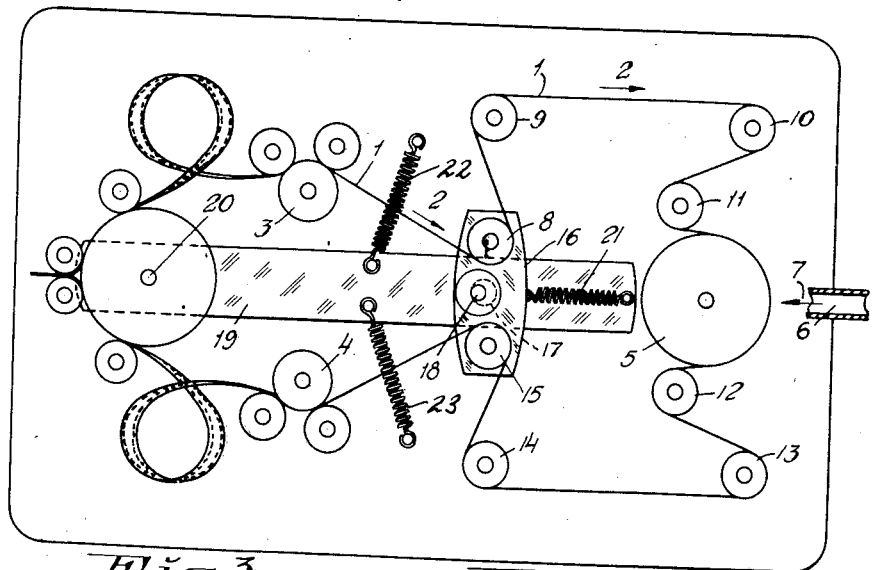

Nov. 30, 1937.   S. S. HANSEN ET AL   2,100,802
FILM STRETCHING DEVICE
Filed Oct. 18, 1935

Inventors
Sven Severin Hansen
Terrance Max Emil Wandt
By Potter, Pierce & Scheffler
Attorneys

UNITED STATES PATENT OFFICE 2,100,802

FILM STRETCHING DEVICE

Sven Severin Hansen and Terrence Max Emil Wendt, Rasunda, Sweden

Application October 18, 1935, Serial No. 45,676
In Sweden October 22, 1934

10 Claims. (Cl. 271—2.3)

The present invention relates to a stretching device for films, particularly sound films or combined sound and picture films, and is applicable to apparatus reproducing or recording sound or sound and pictures in combination. When travelling from a take-off drum to a take-up drum in apparatus of said type the film passes a light aperture (for exposing or recording purposes) and is at the same time subjected to a tensioning stress. In some known apparatus said tensioning stress has been effected by providing at each side of the light aperture stretching rolls which are pressed against the film independently of each other, thus keeping it under a certain tension. However, such stretching means have in practice been found to cause certain disadvantages, since they begin easily to oscillate which causes speed variations of the film motion at the exposing or recording aperture. The oscillatory motion which causes such speed variations is not the normal movement of the stretching means as a result of a change in the film tension, but is an inadvertent motion, hereinafter termed an "oscillatory motion", that causes a change in the film tension. For instance when reproducing sound which has been correctly recorded, this speed variation of the film motion is attended with variations of the pitch of tone which disturbs the reproducing to a great extent.

The object of the invention is to avoid the disadvantage referred to and to provide a stretching device which has the stretching element so related that an oscillatory motion causes no speed variations in the film motion at the exposing or recording aperture.

According to one essential feature of the invention said object is attained by providing between the stretching members effecting the tension a connection adapted to couple the stretching members together so as to equalize tension variations occurring in the film at opposite sides of the aperture upon oscillatory motion of the stretching members. The connection may be mechanical or of any other type adapted to serve the purpose. The stretching members are suitably yielding and mounted in spaced relation to the guiding drum over which the film is moved past the exposing or reproducing aperture, so that the film portion situated between the stretching members and the guiding drum must be carried over a couple of guide rollers. As a result a further advantage will be attained in that the film portion located on the guiding drum is kept rather tight adjacent to the drum so as to prevent great oscillations of the yielding stretching members from effecting displacement of the film portion on the drum.

Figures 2, 3:
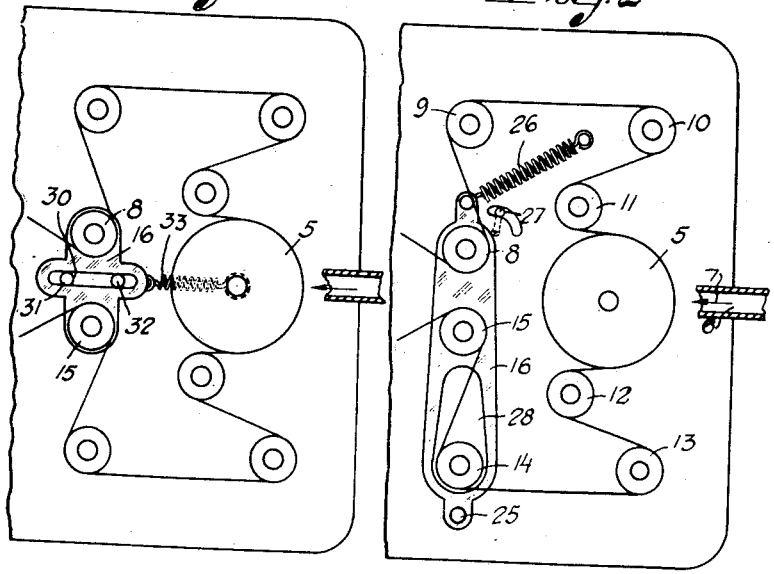

Some suitable embodiments of the stretching device according to the present invention are shown diagrammatically in the accompanying drawing in which Fig. 1 is a side elevation of an embodiment of the invention in which the support for the film stretching members is movable in all directions within certain limits, Fig. 2 is a fragmentary side elevation of an arrangement in which the support for the film stretching members is pivoted at a fixed point, and Fig. 3 is a similar fragmentary side elevation of an embodiment in which the support for the film stretching members is guided for rectilinear motion.

The film 1 coming from a take-off drum as in an ordinary apparatus of the kind referred to above passes in the direction of the arrow 2 over driving rollers 3 and 4 and a guiding drum 5 to a take-up drum. The film is exposed by a beam of light 7 entering through an aperture 6, corresponding to the sound to be recorded. Between the driving rollers 3 and 4 and the guiding drum 5, the film is carried according to the invention by a couple of guide rollers 8, 9, 10, 11 and 12, 13, 14, 15 respectively. The rollers 8 and 15 are mounted on a movable plate 16, and the rollers 9–14 are journalled on the frame of the film exposing apparatus.

In the embodiment according to Figure 1 the plate 16 is movable in all directions within the limits determined by a circular bore 17 therein and a pin 18 secured to a supporting arm 19 pivoted at 20. A spring 21 connects the plate 16 at the centre of its forward edge with the carrying arm 19, thus applying a certain tension on the film by way of the plate 16 and the rollers 8 and 15. Two springs 22 and 23 actuate the arm at opposite sides thereof so as to keep it in a central position as shown.

The plate 16 is thus free to rock about the pin 18, and the plate 16 and arm 19 are free to turn about the pivot pin 20 in such manner as may be necessary to maintain a constant tension in the film. This motion for equalizing the tension may set up an oscillatory motion which does not, however, substantially affect the film tension. If the carrying arm 19 should start an oscillatory excursion in a clockwise direction, i. e. an inadvertent movement which is not required to maintain the same tension in the upper and the lower sections of the film, the immediate result will be a decrease in the tension of the film adjacent the guide roller 15, but this decrease in tension is equalized by a similar decrease in the tension of the film adjacent the guide roller 8. This compensating effect follows from the counterclockwise rocking of the plate 16 about pin 18 as the film tends to loosen about roller 15 while it is still drawn tightly over roller 8. The tension in the film at opposite sides of the guiding drum 5 is thus equalized in spite of the inadvertent oscillatory motion of the carrying arm 19. If the plate 16 inadvertently moves away from the pin 18 along a line through the pivot 20, it is obvious that the tension will be decreased equally in the opposed sections of the film. An oscillatory motion of plate 16 in a clockwise direction tends to decrease the tension in the film adjacent guide roller 15, but this compensating motion takes place immediately as the forces acting on the carrying arm 19 are unbalanced and the entire stretching system turns in a counterclockwise direction about the pivot 20 to effect a similar decrease in the tension at the film where it passes about the guide roller 8. It will thus be seen that the stretching members maintain the desired tension in the film under normal conditions and that inadvertent momentary oscillations do not result in unequal tensions in the film at opposite sides of the guide member 5. The speed of the film is not affected by the oscillatory movements of the stretching members.

In the form of construction shown in Figure 2 the plate 16 carrying the rollers 8 and 15 is pivoted at 25 at one end, the other end being actuated by the spring 26 tending to move the plate towards an abutment 27. The plate 16 is cut out at 28 so as to be able to oscillate without touching the roller 14 or its pin.

The device shown in Figure 3 differs from that of Figure 2 by having the plate 16 carrying the rollers 8 and 15 mounted displaceably instead of pivotally. To this end the plate 16 has a slit 30 accommodating two guide pins 31 and 32. The plate is actuated in the direction towards the guiding drum 5 by a spring 33.

The stretching apparatus proposed above may also be utilized as a safety member in that they may be adapted to disengage the motor for the film automatically, as for instance if the film breaks. To this effect some of the abutting pins as for instance 27 or 31 may be mounted yieldingly and be connected to a releasing device not shown for the motor.

Furthermore, to secure a movement of the film being as uniform as possible all guiding rollers, driving rollers and so on are mounted in a symmetrical relation to the optical axis, i. e. an axis coinciding with the arrow 7. As a result the most sensible portion of the film, i. e. the portion opposite to the point of the arrow 7, will be pulled uniformly past the aperture 6. The device proposed may be used not only in connection with the sound record as assumed in the examples described above but also at the sound reproducing. In the latter case for instance a source of light or possibly a lens system may be provided within the guiding drum 5 which is then made from transparent material.

The invention is not limited to the details shown and described by way of example, modifications being possible within the scope pointed out in the appended claims.

What we claim is:—

1. In a stretching device for films, particularly sound films or such films in combination with picture films, means defining a light aperture, means to move the film past said aperture, stretching members at both sides of said aperture, and means to equalize film tension variations caused by oscillations of the stretching members, said equalizing means including means connecting the stretching member at one side of the aperture to the stretching member at the other side thereof.

2. In a stretching device for films, particularly sound films or such films in combination with picture films, means defining a light aperture, means to move the film past said aperture, yielding stretching members at both sides of said aperture, and means including an element connecting the stretching members at opposite sides of the aperture to equalize film tension variations caused by oscillations of the stretching members.

3. In a stretching device for films, particularly sound films or such films in combination with picture films, means defining a light aperture, means to move the film past said aperture, yielding stretching members mounted at a considerable distance from said aperture at both sides thereof, and means to equalize film tension variations caused by oscillations of the stretching members, said equalizing means including means connecting the stretching member at one side of the aperture to the stretching member at the other side thereof.

4. In a stretching device for films, particularly sound films or such films in combination with picture films, a guiding drum, means to move the film thereover, means defining a light aperture, yielding stretching members at both sides thereof, a plurality of guide rollers arranged between said stretching members and said drum, and means to equalize film tension variations caused by oscillations of the stretching members, said equalizing means including means connecting the stretching member at one side of the aperture to the stretching member at the other side thereof.

5. In a stretching device for films, particularly sound films or such films in combination with picture films, a drum and means defining a light aperture, driving rollers at each side of said drum to move the film past said aperture and over said drum, yielding stretching members and guide rollers for the film, said driving rollers, stretching members and guide rollers at one side of the aperture being symmetrically positioned relatively to said driving rollers, stretching members and guide rollers at the other side thereof, and means to equalize film tension variations caused by oscillations of the stretching members, said equalizing means including means connecting the stretching member at one side of the aperture to the stretching member at the other side thereof.

6. In a stretching device for films, particularly sound films or such films in combination with picture films, means defining a light aperture, a drum to guide the film past said aperture, a film stretching roller at each side of said light aperture and drum, a carrier common for said rollers, and a spring adapted to actuate said carrier to apply tension to the film.

7. In a film stretching device according to claim 6, wherein the carrier consists of a plate, and means supporting said plate for free movement in all directions within determined limits.

8. In a film stretching device according to claim 6, wherein the carrier comprises a plate pivoted to a fixed point.

9. A film stretching device according to claim 6 wherein means is provided for guiding the carrier rectilinearly.

10. A film stretching device according to claim 6 in combination with means controlled by said carrier for interrupting the drive to said driving rollers.

SVEN SEVERIN HANSEN.
TERRENCE MAX EMIL WENDT.